US006996555B2

(12) United States Patent
Muto et al.

(10) Patent No.: US 6,996,555 B2
(45) Date of Patent: Feb. 7, 2006

(54) DEVICE SEARCHING APPARATUS

(75) Inventors: Shin Muto, Kawasaki (JP); Noboru Hamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/576,245

(22) Filed: May 24, 2000

(65) Prior Publication Data
US 2003/0120754 A1 Jun. 26, 2003

(30) Foreign Application Priority Data
May 31, 1999 (JP) .......................................... 11-151906

(51) Int. Cl.
G06F 7/00 (2006.01)

(52) U.S. Cl. .......................... 707/3; 707/10; 707/104.1; 358/1.9; 358/1.13; 358/1.14; 358/1.15

(58) Field of Classification Search ..................... 707/5, 707/100, 3; 385/1.13, 1.14, 1.15; 710/15–19; 358/1.13, 1.14, 1.15
See application file for complete search history.

(56) References Cited

U.S. PATENT DOCUMENTS

| 4,811,199 | A | * | 3/1989 | Kuechler et al. | ............... | 707/3 |
| 5,261,044 | A | * | 11/1993 | Dev et al. | ................... | 345/775 |
| 5,421,011 | A | * | 5/1995 | Camillone et al. | .......... | 709/104 |
| 5,511,208 | A | * | 4/1996 | Boyles et al. | ................. | 707/10 |
| 5,566,278 | A | * | 10/1996 | Patel et al. | .................. | 358/1.15 |
| 5,647,056 | A | * | 7/1997 | Barrett et al. | ............... | 709/220 |
| 5,659,795 | A | * | 8/1997 | Duvall et al. | ................. | 710/15 |
| 5,699,493 | A | * | 12/1997 | Davidson et al. | .......... | 358/1.15 |

(Continued)

FOREIGN PATENT DOCUMENTS

| EP | 0772114 | * | 5/1997 |
| EP | 0 772 114 A1 | | 5/1997 |
| EP | 0 893 754 A1 | | 1/1999 |
| EP | 0893754 | * | 1/1999 |
| JP | 05-053954 | | 3/1993 |
| JP | 07-287679 | | 10/1995 |
| JP | 08-006884 | | 1/1996 |
| JP | 9-198206 | | 7/1997 |
| JP | 09305335 A | * | 11/1997 |

OTHER PUBLICATIONS

Yeong et al., Lightweight Directory Access Protocol, Mar. 1995.*
Wills et al., Resource–Driven Resource Location, 1993, IEEE.*
Network Design Manual "The Future of Enterprise Printing" pp. 1–2 Jan. 1999 [retrieved on Oct. 22, 2002]. Retrieved from the Internet:<URL: http://www.networkcomputing-.com/netdesign/enp11.html>.*
Microsoft Press Computer Dictionary. 1997, p. 290.*

*Primary Examiner*—Kim Vu
*Assistant Examiner*—Tom Gyorfi
(74) *Attorney, Agent, or Firm*—Fitzpatrick, Cella, Harper & Scinto

(57) ABSTRACT

The present invention provides an apparatus for searching a device on a network. The device searching server acquires a search condition from the device searching client, searches a device on the network and returns the search result to the device searching client. If the number of the device matching the search condition is at least equal to a predetermined number, additional information such as location information and charge information is added to the search result. Also if the device matching the search condition is absent, a device of a high frequency of use, determined on the use history, is outputted as the search result.

24 Claims, 12 Drawing Sheets

U.S. PATENT DOCUMENTS

| | | | | |
|---|---|---|---|---|
| 5,760,775 A | * | 6/1998 | Sklut et al. | 345/839 |
| 5,768,516 A | * | 6/1998 | Sugishima | 709/217 |
| 5,778,185 A | * | 7/1998 | Gregerson et al. | 709/226 |
| 5,784,622 A | * | 7/1998 | Kalwitz et al. | 710/200 |
| 5,793,965 A | * | 8/1998 | Vanderbilt et al. | 709/203 |
| 5,796,951 A | * | 8/1998 | Hamner et al. | 709/223 |
| 5,812,865 A | * | 9/1998 | Theimer et al. | 709/228 |
| 5,819,047 A | * | 10/1998 | Bauer et al. | 709/229 |
| 5,841,981 A | * | 11/1998 | Kondo | 709/223 |
| 5,933,584 A | * | 8/1999 | Maniwa | 358/1.15 |
| 5,974,409 A | * | 10/1999 | Sanu et al. | 707/1 |
| 6,026,403 A | * | 2/2000 | Siefert | 705/27 |
| 6,295,527 B1 | * | 9/2001 | McCormack et al. | 707/3 |
| 6,348,971 B2 | * | 2/2002 | Owa et al. | 358/1.15 |
| 6,360,216 B1 | * | 3/2002 | Hennessey et al. | 707/3 |
| 6,360,255 B1 | * | 3/2002 | McCormack et al. | 709/221 |
| 6,369,909 B1 | * | 4/2002 | Shima | 358/1.15 |
| 6,407,823 B1 | * | 6/2002 | Aoki | 358/1.15 |
| 6,421,675 B1 | * | 7/2002 | Ryan et al. | 707/100 |
| 6,430,612 B1 | * | 8/2002 | Iizuka | 709/223 |
| 6,457,883 B1 | * | 10/2002 | Silverbrook et al. | 400/62 |
| 6,477,589 B1 | * | 11/2002 | Suzuki et al. | 710/18 |
| 6,480,863 B1 | * | 11/2002 | Scheifler et al. | 707/103 R |
| 6,574,662 B2 | * | 6/2003 | Sugiyama et al. | 709/223 |
| 2003/0041134 A1 | * | 2/2003 | Sugiyama et al. | 709/223 |

* cited by examiner

FIG. 3

DIRECTORY REGISTER INFORMATION 300

| DEVICE NAME 301 | NETWORK ADDRESS 302 | OBJECT CLASS 303 | DEVICE TYPE 304 | COLOR 305 | DOUBLE-SIDED PRINT 306 | STAPLE 307 |
|---|---|---|---|---|---|---|
| Mr. COLOR | 192.168.16.131 | printer | printer | 1 | 0 | 1 |
| SECOND FLOOR HIGH SPEED MACHINE | 192.168.16.132 | printer | MFP | 0 | 1 | 1 |
| DEVELOPMENT ROOM PRINTER | 192.168.16.155 | printer | printer | 0 | 0 | 1 |
| FIRST FLOOR PRINTER | 192.168.16.156 | printer | printer | 0 | 1 | 1 |
| SCAN | 192.168.16.32 | scanner | scanner | NA | NA | NA |
| ... | ... | ... | ... | ... | ... | ... |

FIG. 6

SEARCH RESULT

| CONDITION NAME | DEVICE NAME | NETWORK ADDRESS | DEVICE TYPE |
|---|---|---|---|
| C1 | Mr. COLOR | 192.168.16.131 | printer |
| C2 | SECOND FLOOR HIGH SPEED MACHINE | 192.168.16.132 | MFP |
| C3 | NULL | NULL | NULL |

C1 : objectclass=printerANDcolor
C2 : objectclass=printerANDdouble-sidedANDstaple
C3 : objectclass=printerANDcolorANDdouble-sidedANDstaple

FIG. 7

| SEARCH··· | NEW ADDITION··· | | | |
|---|---|---|---|---|
| DEVICE | STATUS | DESCRIPTION | ADDRESS | OTHERS |
| [?] | UNKNOWN | COLOR | UNKNOWN | |
| [?] | UNKNOWN | DOUBLE-SIDED, STAPLE | UNKNOWN | |
| [?] | UNKNOWN | COLOR, DOUBLE-SIDED, STAPLE | UNKNOWN | |

CONDITION TABLE

| CONDITION NAME | CONDITION FORMULA |
|---|---|
| C1 | (& (objectclass=printer) (color=1)) |
| C2 | (& (objectclass=printer) (doubleSided=1) (staple=1)) |
| C3 | (& (objectclass=printer) (color=1) (doubleSided=1) (staple=1)) |

FIG. 12

| CONDITION | SEARCH... NEW ADDITION... | | | | | | | |
|---|---|---|---|---|---|---|---|---|
| | DEVICE | STATUS | DESCRIPTION | ADDRESS | LOCATION | UNIT COST | STATUS | |
| C1 | Mr. COLOR | AVAILABLE | COLOR | 191.168.16.131 | | | | |
| C2 | SECOND FLOOR HIGH SPEED MACHINE | AVAILABLE | DOUBLE-SIDED, STAPLE | 191.168.16.132 | 2F OA ROOM | ¥10 | READY | |
| | FIRST FLOOR PRINTER | AVAILABLE | DOUBLE-SIDED, STAPLE | 191.168.16.156 | 1F OA ROOM | ¥10 | TONER WARNING | |
| C3 | SECOND FLOOR HIGH SPEED MACHINE | NONE | DOUBLE-SIDED, STAPLE | 191.168.16.132 | | | | |

| 1301 | 1302 | 1303 | 1304 | 1305 | 1306 | 1307 | 1308 | 1309 | |
|---|---|---|---|---|---|---|---|---|---|
| DEVICE NAME | NETWORK ADDRESS | OBJECT CLASS | DEVICE TYPE | COLOR | DOUBLE-SIDED PRINT | STAPLE | LOCATION INFORMATION | CHARGE INFORMATION | STATUS |
| SECOND FLOOR HIGH SPEED MACHINE | 192.168.16.132 | printer | MFP | 0 | 1 | 1 | SECOND FLOOR OA ROOM | ¥10 | READY |
| FIRST FLOOR PRINTER | 192.168.16.156 | printer | printer | 0 | 1 | 1 | FIRST FLOOR OA ROOM | ¥10 | TONER WARNING |

| MODE | | THE NUMBER OF USE |
|---|---|---|
| SIZE | A4 | 1000 |
| | B4 | 100 |
| | A3 | 100 |
| COLOR | MONOCHROME | 900 |
| | COLOR | 300 |
| DOUBLE-SIDED PRINT | | 200 |
| STAPLE PRINT | | 100 |

DEVICE SEARCHING APPARATUS

BACKGROUND OF THE INVENTION

1. Field of the Invention

The present invention relates to an apparatus for searching a device on a network.

2. Related Background Art

There is conventionally provided a directory service for efficiently finding and utilizing the resources (printer, server, scanner etc.) on the network. The directory service is so to speak a telephone directory on the network, and stores various information. An example of the directory system is LDAP (lightweight directory access protocol), which is defined in RC1777 issued by IETF. This directory service can be used, for example, for searching the device connected to the network, thereby obtaining the information (network address etc.) of the device available on the network.

In such conventional method, however, for example in case of searching a network printer and in case there are indicated plural devices matching the designated search condition such as the presence or absence of stapling function and the present or absence of two-sided printing function, it is difficult to judge which device is to be selected. Also in case there is no device matching the designated search condition, there is indicated no device, so that the user has to execute the cumbersome search process by designating the search condition again until the usable device is found.

SUMMARY OF THE INVENTION

In consideration of the foregoing, an object of the present invention is to provide a device searching apparatus capable of displaying the result of search for a device on the device, based on a condition designated by the user, in a form allowing easy selection by the user.

Another object of the present invention is to facilitate selection by the user of an optimum device among the devices acquired as the result of device search.

Further, the present invention allows to select the optimum device in consideration of the cost and the convenience of positional access, among the devices acquired as the result of device search.

The above-mentioned objects can be attained, according to the present invention, by a device searching server 112 in which, in case the search for the device on a network 100 based on a search request from a device search client 111 finds the device matching the search condition in excess of a predetermined number, there are added additional information such as installation information or charge information to the search result.

Also in case there is no device matching the search condition, a device with a high frequency of use, based on the history of use, is outputted as the result of search.

Other objects of the present invention, and the features thereof, will become fully apparent from the following description which is to be taken in conjunction with the accompanying drawings.

BRIEF DESCRIPTION OF THE DRAWINGS

FIG. 3 is a view showing an example of the device information held by the device searching server;

FIG. 6 is a view showing an example of the research result outputted by the device searching server;

FIG. 7 is a view showing an example of display of the device searching client prior to device search;

FIG. 12 is a view showing an example of display of the device searching client after device search;

FIG. 13 is a view showing an example of the search result which is transmitted by the device searching server to the device searching client;

DESCRIPTION OF THE PREFERRED EMBODIMENTS

Now the present invention will be clarified in detail by preferred embodiments thereof, with reference to the accompanying drawings. The present invention is to search a network device of the attribute desired by the user by an easily understandable method and to display the result of search in a format easily understandable to the user, and is particularly effective in executing the printing operation by connecting a mobile computer to a network in a location visited by the user.

Figure 1:
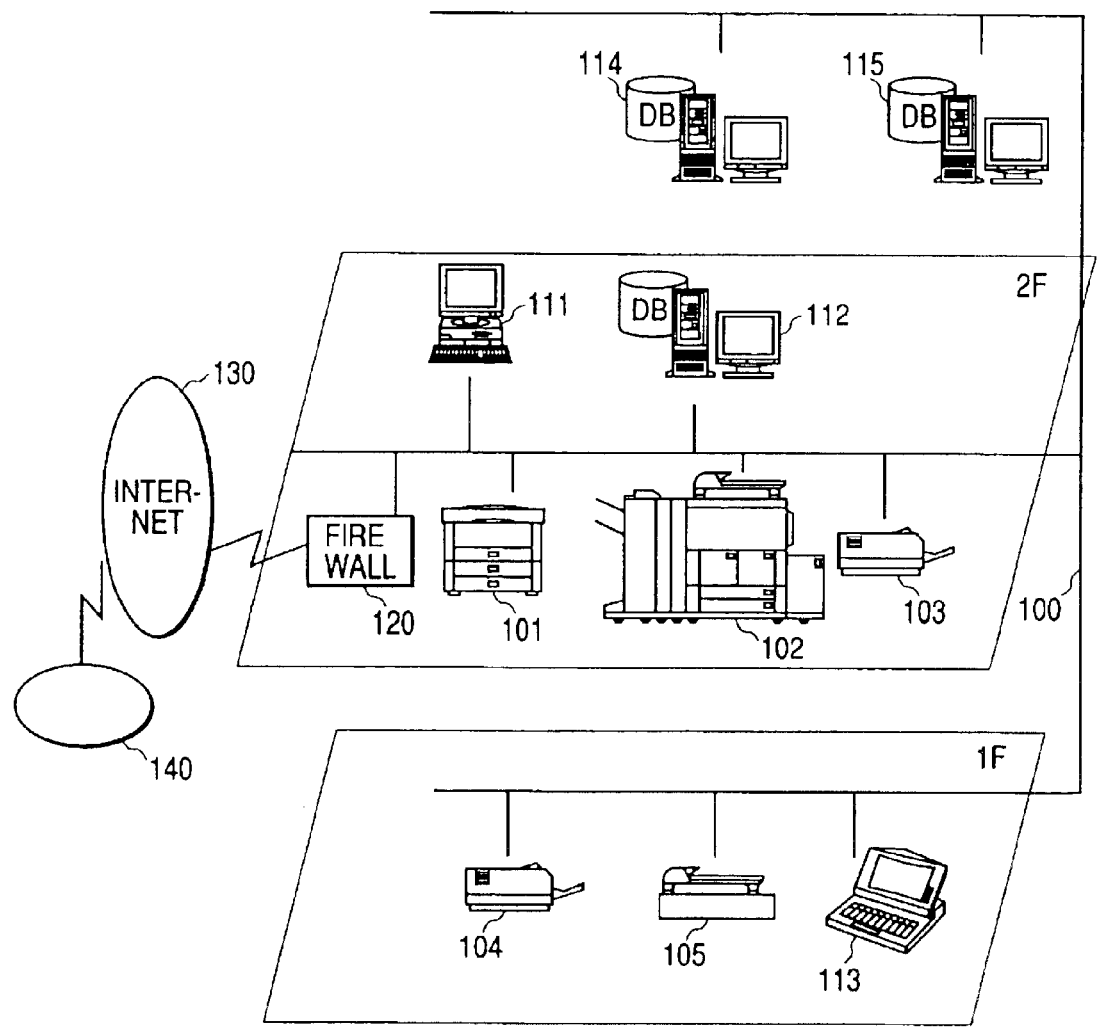
FIG. 1 is a view showing an example of the configuration of a network on which a device searching system embodying the present invention can function.

FIG. 1 shows the configuration of a network on which the device searching system of the present invention can function. In FIG. 1 there are shown a color printer 101, an MFP (multi function peripheral) 102 which is composed of a copying apparatus but can also function as a network printer, monochromatic printers 103, 104, a scanner 105 connected to the network, a desk-top computer (hereinafter called PC) 111, and a notebook computer (hereinafter called notebook PC) 113. These devices can execute the program of the device searching client of the present embodiment, and is adapted, as will be explained later, to issue inquiry information on a device satisfying the desired condition to the device searching server and to display the search result.

A PC 112 is capable of executing the program of the device searching server of the present embodiment and manages, as a database, the attribute information on the network devices 101 to 105.

The device searching server searches, from the above-mentioned database, a device matching the search condition received from the device searching client 111 or 113 through the network, and returns the result of such search.

In the following description, the PC 112 capable of executing the program of the device searching server will be called the device searching server 112.

Among these devices, those 101, 102, 103, 112 and 120 are assumed to be installed on the second floor, while those 104 and 105 are assumed to be installed on the first floor. The notebook PC 113 is currently connected to a LAN 100 from the first floor, but may be detached therefrom owing to its portability. The network 100 connecting these devices is connected through a firewall 120 to the internet 130, and is further connected with another network 140 through the internet 130.

A location server 114 integrally manages the location information of the devices on the network, and stores information indicating the location of installation of each device (plain text information such as "second floor OA room") and image data indicating the location of installation.

A charge server 115 integrally manages the charge information of each device, and stores, for example in case of a printer, the unit price information for each of color printing, monochromatic printing and stapled printing.

The device information registered in the database of the searching server 112, the location information registered in the location server 114 and the charge information registered in the search server 115 are so constructed that there can be extracted the information on a device designated by common device identifying information.

Consequently, on the device registered in the database of the searching server 112, the above mentioned identifying information can be used to acquire the location information and the charge information from the location server 114 and the charge server 115.

Figure 2:
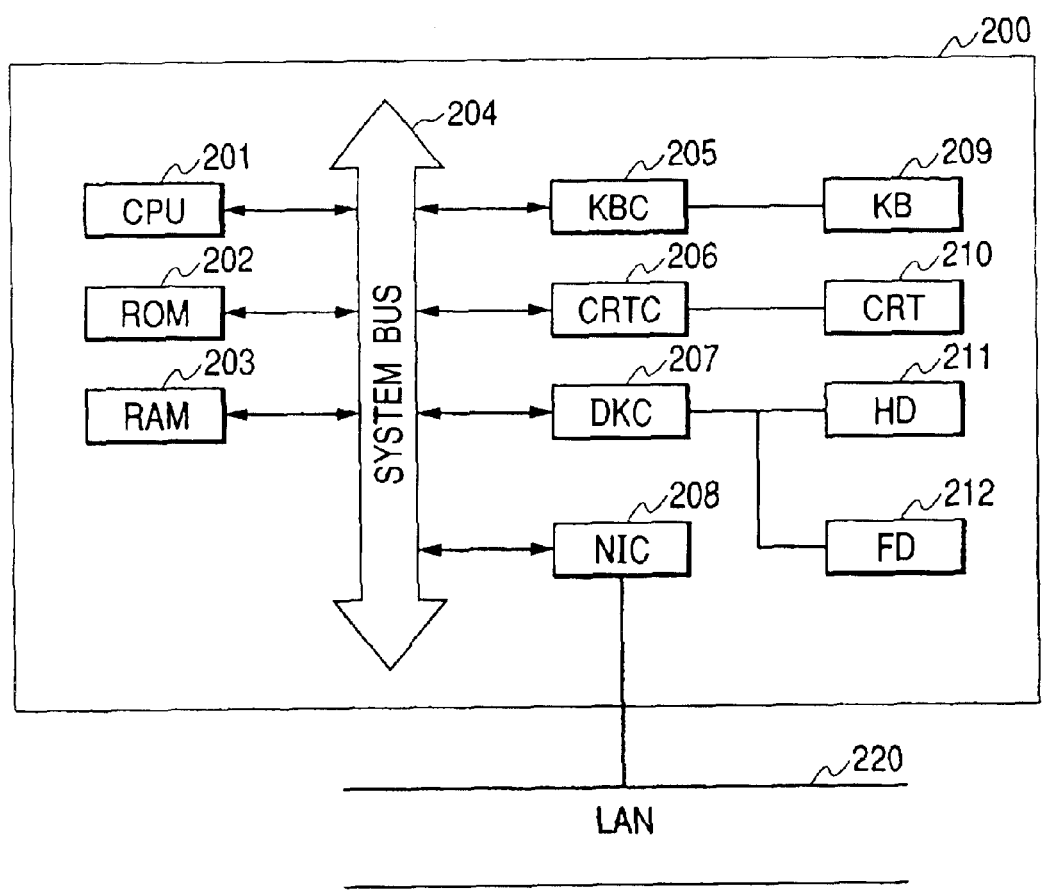
FIG. 2 is a block diagram showing an example of the configuraton of the device searching server and the device searching client.

FIG. 2 is a block diagram showing an example of the configuration of the searching clients 111, 113 and the searching server 112, the configuration being similar to that of an ordinary personal computer. In FIG. 2, 200 indicates the entire PC on which a device searching software or a device searching server software (hereinafter collectively called device searching software), and is equivalent to 111, 112 or 113 in FIG. 1. The PC 200 is provided with a CPU 201 for executing the device searching software stored in a ROM 202 or a hard disk (HD) 211 or supplied from a floppy disk drive (FD) 212, and integrally controls the devices connected to a system bus 204. A RAM 203 functions as a main memory, a work area etc. for the CPU 201. A keyboard controller (KBC) 205 controls the input of instruction from a keyboard (KB) 209 or an unrepresented pointing device. A CRT controller (CRTC) 206 controls the display on a CRT display (CRT) 210. A disk controller (DKC) 207 controls the access to a hard disk (HD) 211 and a floppy disk controller (FD) 212, storing a boot program, various applications, editing files, user files and a network management program. A network interface card (NIC) 208 executes bidirectional data exchange with a network printer, other network equipment and other PC's through the LAN 220. The LAN 220 is equivalent to the LAN 100 shown in FIG. 1.

In the following there will be explained the configuration and function of the device searching server 112. FIG. 3 shows an example of the configuration of the information database 300 on the network devices, managed by the searching server 112.

As shown in FIG. 3, in the database 300 there are registered attribute information 301 to 307, including a device name 301, a network address 302 of a printer, an object class 303 indicating the functional classification of the device, and a device type 304. The object class attribute is an essential attribute, that has to be registered at the registration of the device information on the database 300.

There are also attribute information 305 indicating whether the color printing is supported, 306 indicating whether the two-side printing is supported, and 307 indicating whether the stapling is supported.

The attribute information registered on the database 300 is static information showing no change in the attribute value or semi-static information showing little change in the attribute value.

The status of device showing frequent change in the attribute value such as information on the absence of sheet in the printer or the absence of toner is classified as dynamic information, which is not registered in the database 300.

Also the location information indicating the location of installation of the device and the charge information indicating the monetary charges for various services provided by the device are not frequently changed, but are preferably managed collectively. Therefore, the location information and the charge information are respectively registered in and managed by a location server 114 and a charge server 115.

The device search server 112 may also function as the location server 114 and the charge server 115.

The object class means the functional classification of the device, and, for example if a device is a printer, it is registered as printer class. Also if a device has a printing function, it may be registered as a device of the printer class, even if it is an MFP. On the other hand, the device type indicates the entire functions of the device, so that a single printer and an MFP are distinguished in the device type. In the columns 305 to 307, "1" indicates that the function is supported and "0" indicates that the funcation is not supported. Also "NA" indicates that the information relating to the corresponding attribute is not stored.

The data shown in FIG. 3 will be explained in more details by an example of the device registered in the first row of the table. The first row indicates that a device called "Mr. Color" is present at a network address 192.168.16.131, with a printing function, is constructed as a single printer, and has attributes supporting the color printing and stapling but not supporting the two-side printing function. In the present embodiment, the devices shown in the first to fifth rows of FIG. 3 respectively correspond to 101, 102, 103, 104 and 105 in FIG. 1.

Figure 4:
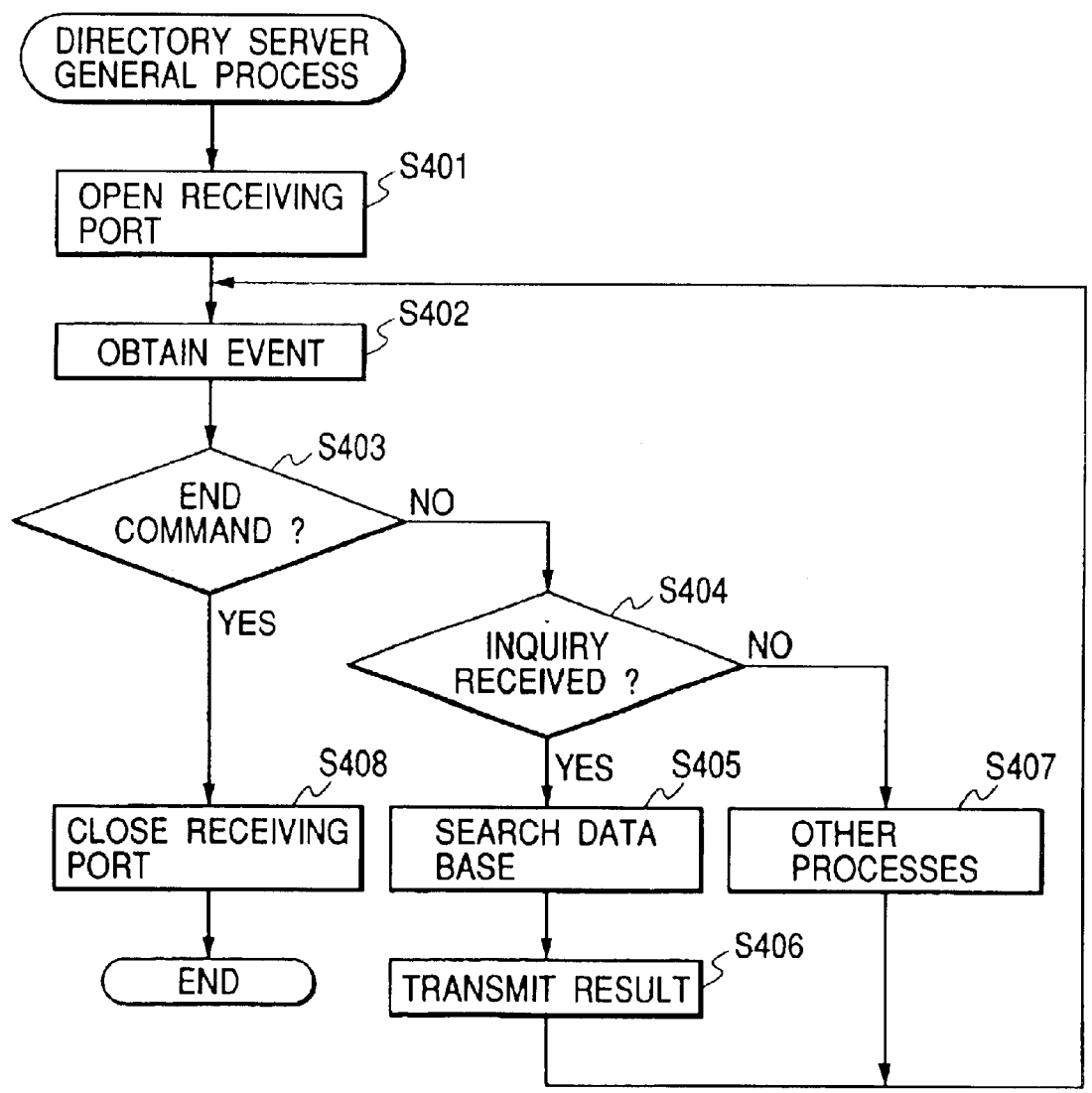
FIG. 4 is a flowchart showing the function of the device searching server.

In the following there will be explained the function of the device searching server 112 with reference to flow charts in FIGS. 4 and 5. FIG. 4 is a flow chart showing the function of the device searching server 112. The discrimination and execution in this process are achieved, as a hardware, by a CPU 201 in the device searching server. When the device searching server 112 is activated, a step S401 opens a reception port for receiving a device searching request from a device searching client. When a search request is received from the device searching client in this operation, the operating system issues a reception event, whereby the reception of the search request is informed to the program. Then a step S402 awaits information of any event from the operating system. When any event is informed, such event is acquired and the sequence proceeds to a next step. A next step S403 discriminates whether the event acquired in the step S402 is a system shutdown event. If so, a step S408 closes the reception port and the sequence is terminated. If the step S403 identifies that the acquired event is not a shutdown event, a step S404 discriminates whether the event is an event of receiving an inquiry from the device searching client. If so, a step S405 refers to the database shown in FIG. 3 and the inquiry condition, thereby selecting an appropriate device. Then a step S406 returns the search result obtained in the step S405 to the device searching client. On the other hand, if the step S404 identifies that the event is not an inquiry reception event, a step S407 executes a process other than the shutdown event or the inquiry reception event, such as an image renewal.

Figure 5:
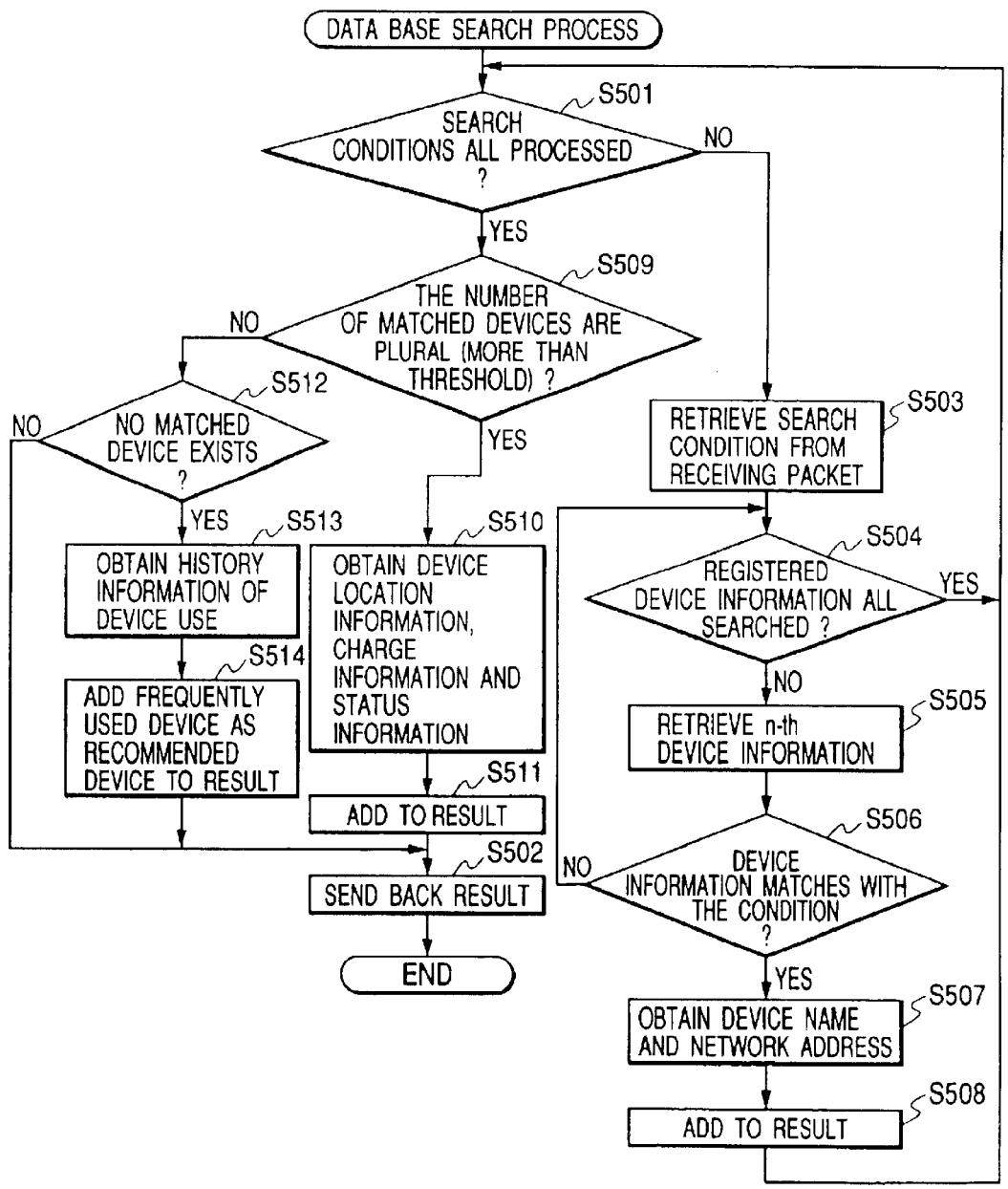
FIG. 5 is a flow chart showing the database searching operation of the device searching server.

FIG. 5 is a flow chart showing the details of a database searching operation in the step S405 in FIG. 4. In brief, in the database searching step of the present embodiment, in case the device searching client designates plural search conditions, there is employed a method of processing such plural conditions one by one, as indicated by an external loop starting from the step S501 and returning thereto through a NO branch of discrimination. An internal loop starting from the step S504 and returning thereto through a NO branch of discrimination is to scan all the registered information in the database for a search condition. In the following the process will be explained in detail, step by step. In the database searching operation, a step S501 discriminates whether all the search conditions have been processed, and, if not, the sequence proceeds to a step S503 for extracting a search condition from the information received from the device searching client. Then a step S504 discriminates whether all the database 300 on the network devices shown in FIG. 3 has been scanned. If scanned, the sequence returns to the step S501 for processing a next search condition. On the other hand, if the step S504 identifies that the database 300 has not yet been scanned, a step S505 extracts data of a device from the database 300 shown in FIG. 3. A next step S506 discriminates whether the data, extracted in the step S505, match the search condition. In case of matching, the sequence proceeds to a step S507, but, in case of non-matching, the sequence returns to the step S504 for continuing the process on the next device information registered in the database 300. A step S507 extracts the device name 301, network address 302 and device type 304 from the information of the device identified to match the search condition in the step S506, and a next step S508 adds these data to the search result. After the process of the step S508, the processing on the currently considered search condition is terminated, and the sequence returns to the step S501 for continuing the process for a next search condition.

If the step S501 identifies that all the search conditions have been processed, the sequence proceeds to a step S509 for discriminating whether the number of the devices matching the search condition is at least equal to a predetermined threshold value.

If the number of the devices matching the search condition is at least equal to the threshold value (assumed as 2 in the present embodiment), the location information, charge information and status information the device are acquired for each of the devices matching the search condition. The location information and the charge information are acquired by making enquiries respectively to the location server 114 and the charge server 115 with designation of the device, and by receiving responses thereto. The status information is acquired by making a direct inquiry to each device and by receiving a response therefrom.

A step S511 adds the information acquired in the step S510 to the search result, and then a step S502 returns the search result to an upper program whereupon the present sequence is terminated.

FIG. 13 shows an example of the search result transmitted from the device search server to the device searching client, and showing the result of the device search by a search condition C2. In the illustrated example, the search condition is met by two devices, namely "second floor high-speed machine" and "first floor printer" and the above-mentioned threshold value is satisfied, so that the location information, the charge information and the status information of the device are added to the search result information.

As explained in the foregoing, the location information and the charge information are acquired by enquiries respectively to the location server 114 and the charge server 115 with the designation of the device and obtaining the reply information.

The status information of the device is acquired by respective enquiries to the "second floor high-speed machine" and the "first floor printer" and obtaining replies therefrom.

If the number of the devices matching the searching condition in the Step S509 is less than the threshold value, a step S512 discriminates whether the device matching the search condition is further present, and, if present, the sequence proceeds to the step S502 for returning the search result to the upper program, whereupon the sequence is terminated, but, if absent, the sequence proceeds to a step S513. A step S513 acquires the use history information of the devices, stored in the database of the searching server 112. Then a step S514 acquires, from the database, a device of the highest frequency of use in the past and adds such device as a recommended device to the search result. Then the step S502 returns the search result to the upper program whereupon the sequence is terminated.

Each device on the network memorizes the use history information of the own device in a non-volatile memory, and the search server 112 collects such history information for judging the frequency of use.

Figures 14, 15:
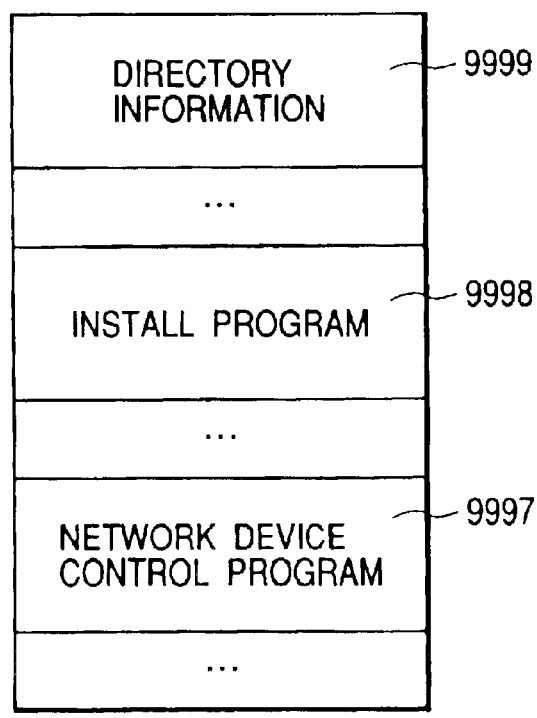
FIG. 14 is a view showing an example of the use history information memorized by the printer.
FIG. 15 is a view showing a memory map in a memory medium for the device searching software embodying the present invention.

FIG. 14 shows an example of the use history information memorized by the printer, showing the storing mode of the number of use for each of the printing modes, such as A4 printing, color printing, two-side printing etc. The number of use may be measured by the number of prints or by the number of the accepted jobs.

The searching server 112, based on the search condition designated by the searching client, acquires the object class attribute as the essential attribute, then acquires the history information as shown in FIG. 14 from the device matching thus acquired object class, and adds the information of the device of the highest frequency of use to the result information.

For example, for the search condition CC3, it picks up the device matching a condition "object class: printer" from the database 300 and acquires the history information from the picked-up device.

Among the acquired history information, the device of the highest frequency of use is returned to the searching client as the result information.

The searching server may periodically collect the history information from the devices and stores such information in the hard disk 112, for judging the frequency of use.

Now there will be considered a case where the device searching client 111 or 113 requests a search for the device with printing function under the following three conditions:

condition C1: color condition C2: two-side and staple condition C3: color, two-side and staple FIG. 6 shows the result of search of the database shown in FIG. 3 according to the algorithm shown in FIG. 5. In FIG. 6, the condition C1 is matched by a device of a device name "Mr. Color" with a network address 192.168.16.131 and a device type: printer. Similarly the condition C2 is met by a device of a device name "second floor high-speed machine" with a network address 192.168.16.132 and a device type: MFP. The condition C3 is not met by any device, and this result is indicated by "NULL".

In the following there will be explained the function of the device searching clients 111, 113. FIG. 7 shows an example of the image display in the device searching client, prior to the device search, wherein various information are displayed in a window 700. The user can execute selection on a search menu 701 with the keyboard 209 or an unrepresented pointing device, thereby making inquiry to the device searching server whether there is a device matching the condition.

A new addition menu 702, when selected by the user, displays an unrepresented dialog, on which the user can enter a desired search condition. In response a new device icon corresponding to the search condition is prepared and displayed on a column 703. In the illustrated example, there are entered three search conditions, namely conditions C1 "color printing", C2 "two-side printing and staple", and C3 "color printing and two-side printing and staple", so that icons are displayed respectively corresponding thereto. All the icons are displayed in the form of a printer, indicating that the search condition is an object class of printer. In case of search for an object class of scanner, a scanner-shaped icon is displayed on the column 703. Also a question mark on the icon indicates that the presence of a device matching the condition is still undetermined. A column 704 indicates the status of a device, and the illustrated example indicates that the presence of a device matching the searching condition is currently undetermined. A column 705 indicates data relating to the device attribute among the search conditions. A column 706 indicates that the presence of a device matching the search condition is still undetermined. A column 707 shows additional information useful for the user in the device selection, and the information is displayed in this column when plural devices matching the search condition are found.

Figures 8, 10:
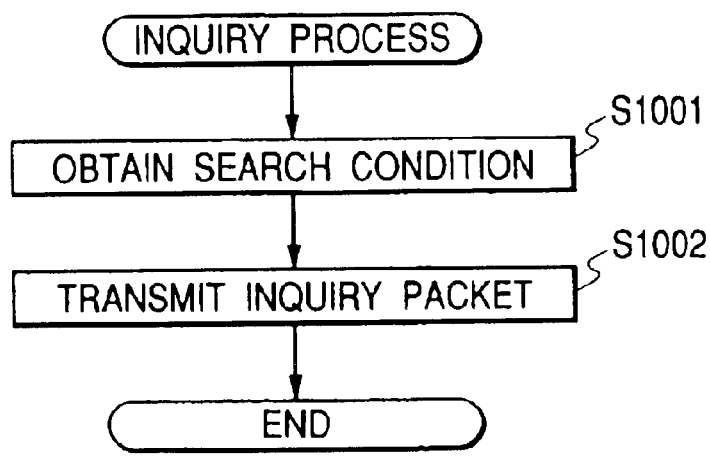
FIG. 8 is a view showing an example of the search condition held in the device searching client.
FIG. 10 is a flow chart showing a device search start operation of the device searching client.

FIG. 8 shows an example of the search condition data designated in the display image shown in FIG. 7, and the present embodiment employs a description based on RFC1960 issued by IETF. In FIG. 8, 801 indicates the name of the search condition while 802 indicates the search condition, in which C1, C2 and C3 respectively correspond to the first, second and third rows of the search condition shown in FIG. 7. The search condition data, entered in the unrepresented dialog explained in FIG. 7, are stored in the format shown in FIG. 8 in the hard disk 211, and thus stored search condition data can be used without the entry of the search condition again thereafter.

Figure 9:
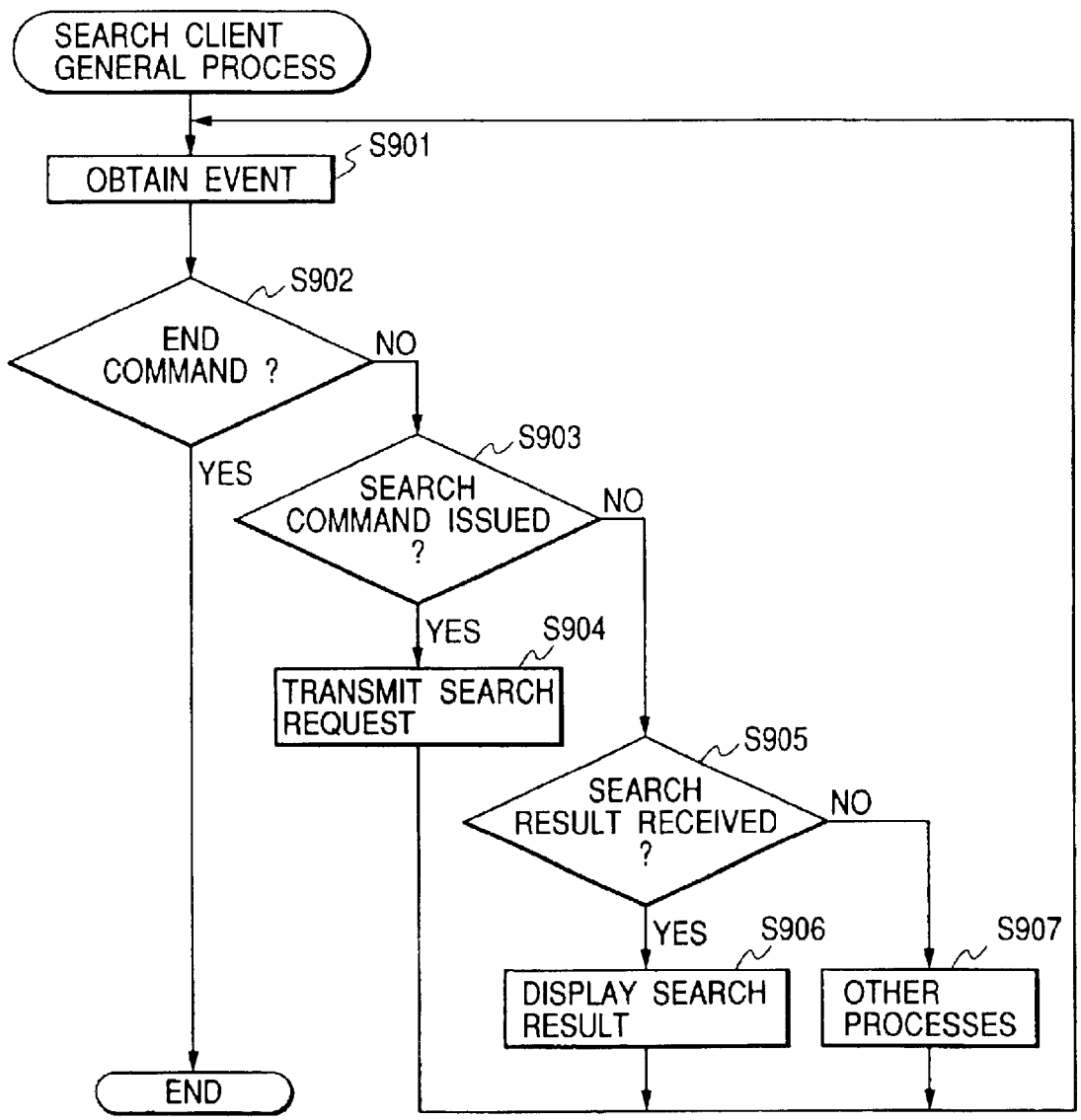
FIG. 9 is a flow chart showing the function of the device searching client.

FIG. 9 is a flow chart showing the function of the device searching clients 111, 113. The program of the device searching client may also be executed on the device searching server 112. The program of the device searching client schematically functions in the following manner. This program functions as an event driven program, which awaits an event until the system is closed and, when an event is generated, executes a process on such event. The main events include a system ending event, a device search request event, and a device search result receiving event. In the following there will be explained the steps of the program.

When the searching client is activated, at first a step S902 waits until an event is generated. When an event is generated, such event is acquired and the sequence proceeds to a step S902. A step S902 discriminates whether the event acquired by the step S901 is a system ending command, issued by the user through the keyboard 209 or the unrepresented pointing device. If it is identified that the user has issued the ending command, the program is terminated. On the other hand, if the step S902 identifies that the event is not an end command issuing command, a step S903 discriminates whether the event acquired in the step S902 is a device searching command issued by the selection of the searching menu 701 by the user. If the event is identified as the issuance of a device searching command, the sequence proceeds to a step S904 for transmitting a device searching request to the device searching server 112.

On the other hand, if the step S903 identifies that the event is not the issuance of a device searching command, the sequence proceeds to a step S905. A step S905 discriminates whether the event acquired in the step S901 is a reception of the search result returned from the device searching server 112 in response to the device searching request transmitted in the step S904. If the event is identified as the reception of the returned result, the sequence proceeds to a step S906 for displaying the received search result in the window 700. After the step S906, the sequence returns to the step S901 for awaiting a next event. On the other hand, if the step S905 identifies that the event is not the reception of the returned result, the sequence proceeds to a step S907 for executing another process. Another process means, for example, redrawing of the display image for example at the starting of the program or when the user moves the window in the display image. After the step S907, the program returns to the step S901 for awaiting a next event.

FIG. 10 is a flow chart showing the details of a search requesting operation S904 in the flow chart shown in FIG. 9. At first a step S1001 makes an access to the hard disk 211 for acquiring the search condition, registered in advance as explained in relation to FIG. 8. A next step S1002 transmits the search condition to the device searching server 112, thereby requesting the search for the network device.

In the present embodiment, the address of the device searching server is assumed to be already known, for example by storing a value, entered by the user through the keyboard 209, in the hard disk 211 and by reading such stored value, but such method is not restrictive. As an alternative, it is also possible to acquire the address from the network for example by utilizing a method such as double space in the programming language Linda.

Figure 11:
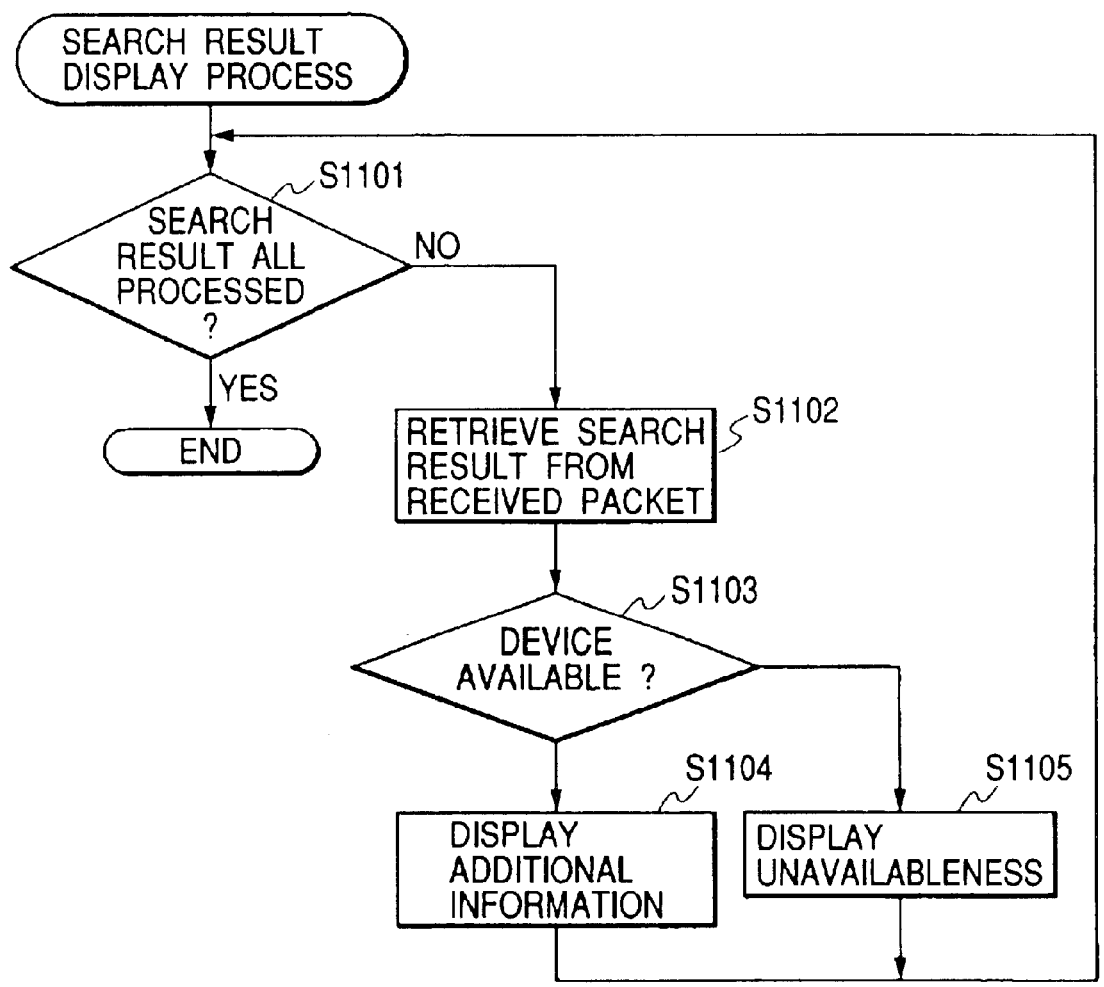
FIG. 11 is a flow chart showing a device search receiving operation of the device searching client.

FIG. 11 is a flow chart showing the details of a search result receiving operation S906 in the flow chart shown in FIG. 9. In this process, there are returned, from the searching server 112, information on the device matching each of the plural search conditions C1 to C3 shown in FIG. 8, and there is executed a display process on each of such information. At first a step S1101 discriminates whether all the received search results have been processed, and, if not, the sequence proceeds to a step S1102 for obtaining one of the received search results. A next step S1103 checks the content of the search result taken out in the step S1102 and discriminates whether a network address has been acquired, thereby judging whether the device is usable. If the network address is acquired, the device is identified as usable and the sequence proceeds to a step S1104, for displaying the additional information based on the acquired information. After the step S1104, the sequence returns to the step S1101 for processing a next search result. On the other hand, if the step S1103 identifies that the device is not available, the sequence proceeds to a step S1105 for displaying that the device is not usable.

When the step S1101 discriminates that all the search processes have been completed, the sequence is terminated.

FIG. 12 shows an example of the image display of the device search clients 111, 113 after the search operation. In comparison with the image prior to the search operation shown in FIG. 7, or the first search condition (color), there is found a device of a name "Mr. Color" and its network address etc. are displayed. For the second search condition (two-side and staple) there are found two devices "second floor high-speed machine" and "first floor printer", and there are displayed the network address etc. as well as the installation information charge information in the column 707. Since the device matching the search information is found in a number at least equal to the threshold value ("2" in this case), the address information is displayed in order to facilitate the selection of the device by the user. As there has not been found a device matching the third search condition (color, two-side and staple), there is instead displayed the information of the "second floor high-speed machine" as the device of the highest frequency of use.

Thus the present embodiment allows to display the result of the device search on the network based on the user designated condition, in a format enabling easy selection by the user.

The above-described network device control program of the present invention may be installed from the exterior and executed by the PC 200. The present invention is applicable also to a case where an information group including a program is loaded into the PC 200, for execution therein, from a memory medium such as a CD-ROM or a floppy disk, or from an external memory medium through the electronic mail or the personal computer communication.

FIG. 15 shows an example of the memory map of a memory medium storing the program of the present embodiment, wherein a CD-ROM is assumed as the memory medium. A directory information storage area 9999 indicates the position of an installation program storage area 9998 and a network device control program storage area 9997. An area 9998 stores the installation program, and an area 9997 stores the network device control program. At the installation of the network control program of the present invention into the PC 200, at first an installation program stored in the area 9998 is loaded in the system and executed by the CPU 201. Then the installation program, executed by the CPU 201, reads the network control program from the area 9997 and stores it in the hard disk 211.

The present invention may be applied to a system or an integrated apparatus consisting of plural equipment (for example host computer, interface devices, reader etc.) or an apparatus consisting of a single equipment.

Also the objects of the present invention can naturally be attained in a case where the program codes of a software realizing the functions of the aforementioned embodiments are supplied to a system or an apparatus, and are read and executed by the computer (CPU or MPU) of the above-mentioned system or apparatus.

In such case the program codes read from the memory medium realize the functions of the aforementioned embodiments, and the memory medium storing such program codes constitutes the present invention.

The memory medium storing such program codes can be, for example, a floppy disk, a hard disk, an optical disk, a magnetooptical disk, a CD-ROM, a CD-R, a magnetic tape, a non-volatile memory card or a ROM.

The present invention also includes such program codes not only in a case where the functions of the aforementioned embodiments are realized by the execution of the read program codes by the computer but also a case where an operating system or the like functioning on the computer executes all or a part of the actual processes under the control of such program codes thereby realizing the functions of the aforementioned embodiments.

The present invention further includes a case wherein the program codes read from the memory medium are once stored in a memory provided in a function expansion board inserted into the computer or a function expansion unit connected to the computer, and a CPU provided in the function expansion board or the function expansion unit executes all the process or a part thereof according to the instruction of such program codes, thereby realizing the functions of the aforementioned embodiments.

Also the present invention is naturally applicable to a case where the program codes of a software realizing the functions of the aforementioned embodiments are delivered, from the memory medium storing such program codes, to the requesting person through a communication channel such as a personal computer communication.

As explained in the foregoing, the embodiment of the present invention displays also additional information in case the device search finds plural devices, so that the user is enabled to select an optimum device from such plural devices, based on such additional information.

Also, in case the device search finds plural devices, there are displayed the charge information and installation information of the devices as the additional information, so that the user is enabled to select an optimum device in consideration of the cost and the location convenience of access.

Also in case the search does not find the device matching the condition of search, there is displayed a device of a high frequency of use based on the use history, so that the procedure of searching again may be dispensed with.

What is claimed is:

1. A device searching apparatus that searches for at least one device on a network, comprising:

obtaining means for obtaining a plurality of search conditions, each related to a device function, in order to search for a desired device on the network;

search means for searching for at least one device that satisfies the plurality of search conditions obtained by said obtaining means;

search control means for controlling said search means to execute searches under the plurality of search conditions obtained by said obtaining means, in response to input of a search request;

recognition means for recognizing whether a number of devices, identified by said search means, that satisfy the plurality of search conditions is smaller than a predetermined number; and output means for outputting a search result based on the searches by said search means, wherein if said recognition means recognizes that the number of devices that satisfy the plurality of search conditions is smaller than the predetermined number, said search control means controls said search means to add information on one or more previously used devices to the search result.

2. An apparatus according to claim 1, wherein said search means performs a first search and a second search based on an obtained value representing a plurality of functions, and said output means distinguishably displays a search result of the first search and a search result of the second search on a display unit.

3. An apparatus according to claim 2, further comprising:

control means for controlling said output means to output the search result such that the search result includes identification information and attribute information of a device that satisfies at least one of the first search condition and the second search condition; and communication means for acquiring device information, registered corresponding to identification information in another apparatus on the network, from the other apparatus, wherein said control means controls said communication means to acquire additional information on each device identified in the search result, and causes the additional information to be added to the search result.

4. An apparatus according to claim 3, wherein said control means is adapted to acquire, from an apparatus that manages location information of devices on the network, location information of each device identified in the search result, and to add the location information to the search result.

5. An apparatus according to claim 3, wherein said control means is adapted to acquire, from an apparatus that manages charge information of devices on the network, charge information of each device identified in the search result, and to add the charge information to the search result.

6. A device searching apparatus that searches for at least one device on a network, comprising:

management means for managing a database that includes identification information for identifying a device on the network and static information associated therewith;

input means for entering a first group of attributes and a second group of attributes, both related to a device function, for searching for at least one desired device on the network;

search means for searching for at least one device from the database having the first group of attributes entered by said input means and for searching for at least one device from the database having the second group of attributes entered by said input means;

output means for outputting a search result that includes identification information and static information about a device having at least one of the first and the second groups of attributes;

control means for adding dynamic information to the search result, according to a number of devices having at least one of the first and the second groups of attributes; and discrimination means for discriminating a device with a high frequency of use, based on the dynamic information, which relates to a use history of devices on the network, wherein, in a case in which a number of devices having the first or second group of attributes is zero, said control means adds to the search result information of the device with the high frequency of use discriminated using said discrimination means.

7. An apparatus according to claim 6, wherein, in a case in which a number of devices identified in the search result is at least equal to a predetermined value, said control means acquires dynamic information from a device having at least one of the first and the second groups of attributes and adds the dynamic information to the search result.

8. A device according to claim 6, wherein the first group of attributes used by said search means includes at least one of color, double side, and staple, said output means outputs to a display unit, and said search means searches for devices having the first group of attributes and the second group of attributes, respectively, in accordance with a search instruction inputted by a user, such that found devices are automatically displayed on the display unit as a list.

9. A device searching method for searching for at least one device on a network, comprising:

an obtaining step, of obtaining a plurality of search conditions, each related to a device function, in order to search for a desired device on the network;

a search step, of searching for at least one device from the database that satisfies the plurality of search conditions obtained in said obtaining step;

a search control step, of controlling said search step to execute searches under the plurality of search conditions obtained in said obtaining step, in response to input of a search request;

a recognition step, of recognizing whether a number of devices, identified in said search step, that satisfy the plurality of search conditions is smaller than a predetermined number; and an output step, of outputting a search result based on the searches in said search step, wherein if it is recognized in said recognition step that the number of devices that satisfy the plurality of search conditions is smaller than the predetermined number, then said search control step is performed to control execution of said search step to add information on one or more previously used devices to the search result.

10. A method according to claim 9, wherein said search step performs includes performing a first search and a second search based on an obtained value representing a plurality of functions, and said output step includes distinguishably displaying a search result of the first search and a search result of the second search on a display unit.

11. A method according to claim 10, further comprising:

a control step, of controlling said output step to output the search result such that the search result includes identification information and attribute information of a device that satisfies at least one of the first search condition and the second search condition; and a reception step, of receiving device information, registered corresponding to identification information in another apparatus on the network, from the other apparatus, wherein said control step includes controlling said reception step to acquire additional information on each device identified in the search result, and causing the additional information to be added to the search result.

12. A method according to claim 11, wherein said control step includes acquiring, from an apparatus that manages location information of devices on the network, location information of each device identified in the search result, and adding the location information to the search result.

13. A method according to claim 11, wherein said control step includes acquiring, from an apparatus that manages charge information of devices on the network, charge information of each device identified in the search result, and adding the charge information to the search result.

14. A device searching method for searching for at least one device on a network, comprising:

a management step, of managing a database that includes identification information for identifying a device on the network and static information associated therewith;

an input step, of entering a first group of attributes and a second group of attributes, both related to a device function, for searching for at least one desired device on the network;

a search step, of searching for at least one device from the database having the first group of attributes entered in said input step and of searching for at least one device from the database having the second group of attributes entered in said input step;

an output step, of outputting a search result that includes identification information and static information about a device having at least one of the first and the second groups of attributes;

a control step, of adding dynamic information to the search result, according to a number of devices having at least one of the first and the second groups of attributes; and a discrimination step, of discriminating a device with a high frequency of use, based on the dynamic information, which relates to a use history of devices on the network, wherein, in a case in which a number of devices having the first or second group of attributes is zero, said control step includes adding to the search result information of the device with the high frequency of use discriminated in said discrimination step.

15. A method according to claim 14, wherein, in a case in which a number of devices identified in the search result is at least equal to a predetermined value, said control step includes acquiring dynamic information from a device having at least one of the first and the second groups of attributes and adding the dynamic information to the search result.

16. A memory medium storing a computer program to be executed by a computer to implement a device searching method for searching for at least one device on a network, the method comprising:

an obtaining step, for obtaining a plurality of search conditions, each related to a device function, in order to search for a desired device on the network;

a search step, of searching for at least one device from the database that satisfies the plurality of search conditions obtained in said obtaining step;

a search control step, of controlling said search step to execute searches under the plurality of search conditions obtained in said obtaining step, in response to input of a search request;

a recognition step, of recognizing whether a number of devices, identified in said search step, that satisfy the plurality of search conditions is smaller than a predetermined number; and an output step, of outputting a search result based on the searches in said search step, wherein if it is recognized in said recognition step that the number of devices that satisfy the plurality of search conditions is smaller than the predetermined number, then said search control step is performed to control execution of said search step to add information on one or more previously used devices to the search result.

17. A memory medium according to claim 16, wherein said search step includes performing a first search and a second search based on an inputted value representing a plurality of functions, and said output step includes distinguishably displaying a search result of the first search and a search result of the second search on a display unit.

18. A memory medium according to claim 17, wherein the method further comprises:

a control step of controlling performance of said output step to output the search result such that the search result includes identification information and attribute information of a device that satisfies at least one of the first search condition and the second search condition; and a reception step, of receiving device information, registered corresponding to identification information in another apparatus on the network, from the other apparatus, wherein said control step includes controlling performance of said reception step to acquire additional information on each device identified in the search result, and causing the additional information to be added to the search result.

19. A memory medium according to claim 18, wherein said control step includes acquiring, from an apparatus that manages location information of devices on the network, location information of each device identified in the search result, and adding the location information to the search result.

20. A memory medium according to claim 18, wherein said control step includes acquiring, from an apparatus that manages charge information of devices on the network, charge information of each device identified in the search result, and adding the charge information to the search result.

21. A memory medium storing a computer program to be executed by a computer to implement a device searching method for searching for at least one device on a network, the method comprising:

a management step, of managing a database that includes identification information for identifying a device on the network and static information associated therewith;

an input step, of entering a first group of attributes and a second group of attributes, both related to a device function, for searching for at least one desired device on the network;

a search step, of searching for at least one device from the database having the first group of attributes entered in said input step and of searching for at least one device from the database having the second group of attributes entered in said input step;

an output step, of outputting a search result that includes identification information and static information of a device having at least one of the first and the second groups of attributes;

a control step, of adding dynamic information to the search result, according to a number of devices having at least one of the first and the second groups of attributes; and a discrimination step, of discriminating a device with a high frequency of use, based on the dynamic information, which relates to a use history of devices on the network, wherein, in a case in which a number of devices having the first or second group of attributes is zero, said control step adds to the search result information of the device with the high frequency of use discriminated in said discrimination step.

22. A memory medium according to claim 21, wherein, in a case in which a number of devices identified in the search result is at least equal to a predetermined value, said control step includes acquiring dynamic information from a device having at least one of the first and the second groups of attributes and adding the dynamic information to the search result.

23. A device searching system that searches for at least one device on a network, comprising:
- an obtaining unit for obtaining a first search condition and a second search condition, both related to a device function, in order to search for a desired device on the network;
- a search computer for searching for at least one device that satisfies the first search condition obtained by said obtaining unit and for searching for at least one device that satisfies the second search condition entered obtained by said obtaining unit; and
- a search controller for controlling said search computer to execute searches in response to input of a search request;
- a recognition unit for recognizing whether a number of devices, identified by said search computer, that satisfy the first and second search conditions is smaller than a predetermined number; and
- an output unit for outputting a search result based on the searches performed by said search computer,
- wherein if said recognition unit recognizes that the number of devices that satisfy the first and second search conditions is smaller than the predetermined number, said search controller controls said search computer to add information on one or more previously used devices to the search result.

24. A device searching system that searches for at least one device on a network, comprising:
- a management computer for managing a database that includes identification information for identifying a device on the network and static information associated therewith;
- an input unit for entering a first group of attributes and a second group of attributes, both related to a device function, for searching for at least one desired device on the network;
- a search computer for searching for at least one device from the database having the first group of attributes entered by said input unit and for searching for at least one device from the database that satisfies the second group of attributes entered by said input unit;
- an output unit for outputting a search result that includes identification information and static information of a device having at least one of the first and the second groups of attributes;
- a control computer for adding dynamic information to the first and the second groups of attributes, according to a number of devices having at least one of the first and the second groups of attributes; and
- a discrimination computer for discriminating a device with a high frequency of use, based on the dynamic information, which relates to a use history of devices on the network,
- wherein, in a case in which a number of devices having the first or second group of attributes is zero, said control computer adds to the search result information of the device with the high frequency of use discriminated using said discrimination computer.

* * * * *

UNITED STATES PATENT AND TRADEMARK OFFICE
CERTIFICATE OF CORRECTION

| | | |
|---|---|---|
| PATENT NO. | : 6,996,555 B2 | Page 1 of 1 |
| APPLICATION NO. | : 09/576245 | |
| DATED | : February 7, 2006 | |
| INVENTOR(S) | : Shin Muto et al. | |

It is certified that error appears in the above-identified patent and that said Letters Patent is hereby corrected as shown below:

<u>ON COVER PAGE AT (56) FOREIGN PATENT DOCUMENTS</u>

"09305335 A" should read --9-305335 A--.

<u>COLUMN 1</u>

Line 50, "are" should read --is--.

<u>COLUMN 4</u>

Line 30, "funcation" should read --function--.

<u>COLUMN 5</u>

Line 50, "the device" should be deleted.

<u>COLUMN 6</u>

Line 54, "devices and stores" should read --devices, storing--.

<u>COLUMN 7</u>

Line 8, "are" should read --is--.

<u>COLUMN 12</u>

Line 29, "performs" should be deleted.

Signed and Sealed this

Fourteenth Day of November, 2006

JON W. DUDAS